United States Patent
Heiniger et al.

(10) Patent No.: US 12,203,523 B2
(45) Date of Patent: Jan. 21, 2025

(54) ACTIVE ANTI-VIBRATION SYSTEM FOR A PRECISION MOTION SYSTEM

(71) Applicant: ETEL S.A., Môtiers (CH)

(72) Inventors: Laurent Heiniger, Neuchâtel (CH); Yannick Droval, Neuchâtel (CH)

(73) Assignee: ETEL S.A., Môtiers (CH)

( * ) Notice: Subject to any disclaimer, the term of this patent is extended or adjusted under 35 U.S.C. 154(b) by 0 days.

(21) Appl. No.: 18/470,886

(22) Filed: Sep. 20, 2023

(65) Prior Publication Data

US 2024/0110610 A1   Apr. 4, 2024

(30) Foreign Application Priority Data

Sep. 30, 2022 (EP) .................................. 22199078

(51) Int. Cl.
*F16F 15/02* (2006.01)

(52) U.S. Cl.
CPC .......... *F16F 15/02* (2013.01); *F16F 2226/04* (2013.01); *F16F 2230/0005* (2013.01); *F16F 2230/36* (2013.01)

(58) Field of Classification Search
CPC ................... F16F 15/02; F16F 2226/04; F16F 2230/0005; F16F 2230/36
(Continued)

(56) References Cited

U.S. PATENT DOCUMENTS

| | | | |
|---|---|---|---|
| 6,021,991 A * | 2/2000 | Mayama | F16F 15/02 267/136 |
| 9,625,000 B2 * | 4/2017 | Hoffmann | F16F 13/26 |
| 2009/0121399 A1 * | 5/2009 | Hindle | F16F 15/005 310/90 |

FOREIGN PATENT DOCUMENTS

| | | |
|---|---|---|
| CN | 102410337 A | 4/2012 |
| EP | 0083902 A2 | 7/1983 |

(Continued)

OTHER PUBLICATIONS

European Search Report issued in corresponding EP Patent Application No. 22199078 dated Mar. 21, 2023, pp. 1-2.

*Primary Examiner* — Todd M Epps

(74) *Attorney, Agent, or Firm* — Carter, DeLuca & Farrell LLP

(57) ABSTRACT

An active anti-vibration system includes a mounting base having an upper side onto which a motion system is mountable and a lower side, a supporting frame resting on the floor, and active bearings mounted into an active bearings compartment defined by the lower side of the mounting base and an upper side of the supporting frame. Each active bearing includes actuators for imparting counteracting forces to compensate for reactions forces generated by the motion system, when mounted onto the mounting base and operating, to avoid unwanted movements of the mounting base and dampen any residual movements. Each active bearing further includes an upper panel mounted against the lower side of the mounting base, and a lower panel mounted against the upper side of the supporting frame. The mounting base includes through-holes extending from the upper side to the lower side of the mounting base, and a first set of fixation elements mounted inside respective through-holes to secure the active bearing upper panel to the lower side of the mounting base. The active bearings include a second set of fixation elements to secure the active bearing lower panel to the upper side of the supporting frame.

22 Claims, 5 Drawing Sheets

(58) Field of Classification Search
USPC .......................................................... 248/638
See application file for complete search history.

(56)         References Cited

FOREIGN PATENT DOCUMENTS

| FR | 1258640 A | 4/1961 |
| KR | 10-2012-0022572 A | 3/2012 |
| KR | 10-2021-0075856 A | 6/2021 |
| WO | 2015/021820 A1 | 2/2015 |

* cited by examiner

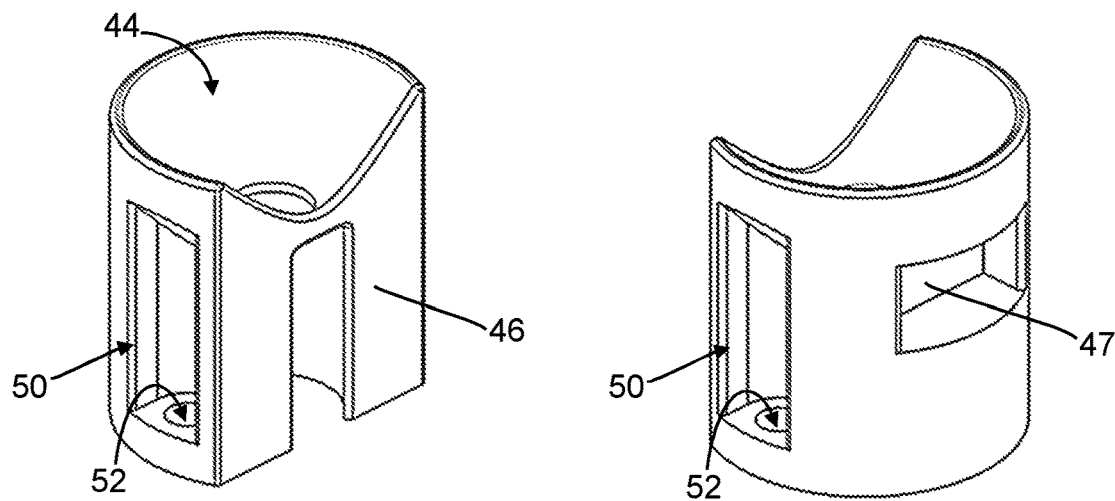
Fig. 7a  Fig. 7b
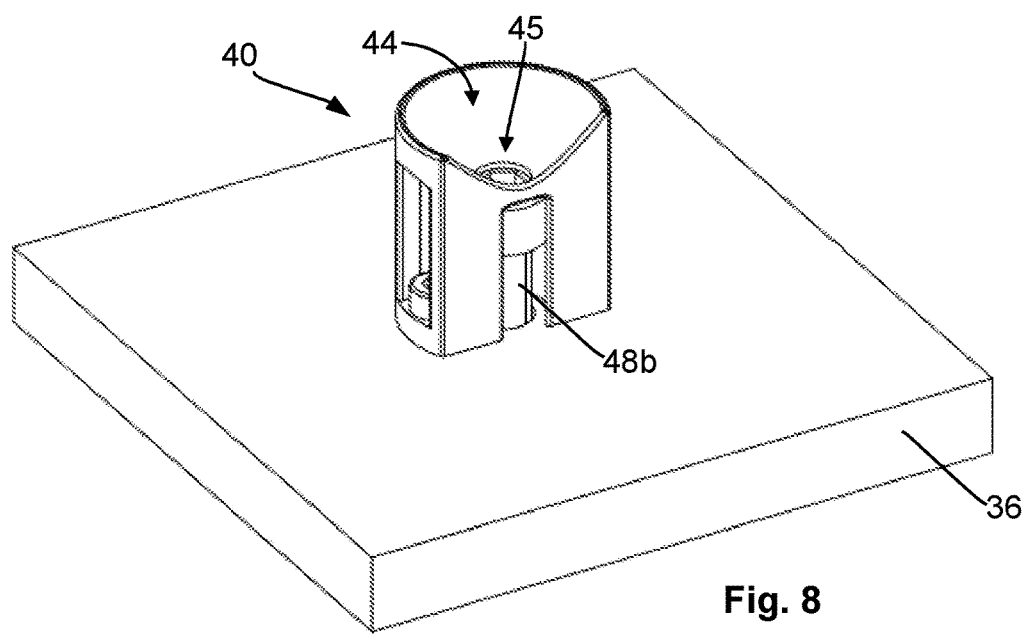
Fig. 8
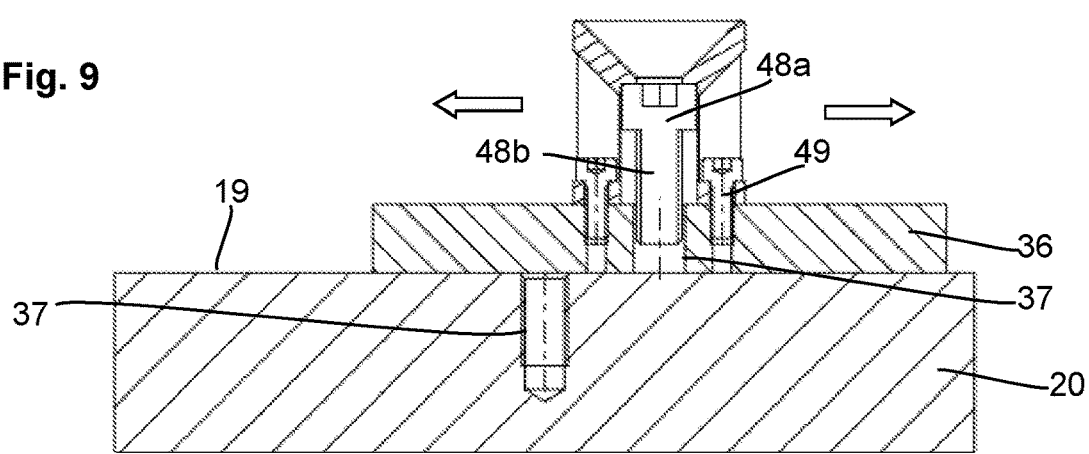
Fig. 9

ACTIVE ANTI-VIBRATION SYSTEM FOR A PRECISION MOTION SYSTEM

CROSS-REFERENCE TO RELATED APPLICATIONS

The present application claims priority to Application No. 22199078.1, filed in the European Patent Office on Sep. 30, 2022, which is expressly incorporated herein in its entirety by reference thereto.

FIELD OF THE INVENTION

The present invention relates to an active anti-vibration system for a precision motion system. The system includes, for example, a mounting base for a precision motion system, e.g., a semiconductor processing equipment. The anti-vibration system includes, for example, active bearings for isolating the mounting base from ground vibrations and imparting counteracting forces to the mounting base to compensate for reactions forces generated by the precision motion system when operating. The active anti-vibration system is adapted for ready replacement of an active bearing in case of failure. The present invention also relates to a method for disassembling an active bearing from the active anti-vibration system for its replacement.

BACKGROUND INFORMATION

Precision motion systems, e.g., semiconductor processing equipment, such as positioning devices, coordinate measuring machines or robots, may include active anti-vibration systems, as described, for example, in U.S. Pat. No. 6,021,991, for isolating precision motion systems from ground vibrations. Active anti-vibration systems typically include several active bearings that are assembled between a granite base onto which the precision motion system can be mounted and a metallic frame that rests on the floor. Active anti-vibration systems therefore ensure the operation of precision motion systems with as little parasitic movement as possible, as a result of which a high positioning or measurement accuracy is obtained.

Each active bearing includes linear motors, and vertical and horizontal sensors are connected to electronic controllers to drive each linear motor as a function of the output of vertical and horizontal sensors and as a function of the known movements of the precision motion system to avoid unwanted movements of the granite base and dampen any residual movements. The active bearings support the granite base upwardly using a mechanical spring or an air spring, thereby passively isolating the base from the floor vibrations.

Active bearings are therefore complex systems that sometimes must be replaced in case of failure. Replacement of any active bearing is, however, difficult as it entails disassembling the granite base from the metallic frame in order to unscrew the active bearings.

SUMMARY

Example embodiments of the present invention provide an active anti-vibration system for a precision motion system, adapted for ready replacement of active bearings in case of failure.

Example embodiments of the present invention provide a method for disassembling an active bearing from the active anti-vibration system for ready replacement of the active bearing.

According to example embodiments of the present invention, an active anti-vibration system includes a mounting base having an upper side onto which a motion system is mountable, a supporting frame resting on, or adapted to rest on, the floor, and active bearings mounted into an active bearing compartment defined by a lower side of the mounting base and an upper side of the supporting frame. Each active bearing includes actuators for imparting counteracting forces to the mounting base to compensate for reactions forces generated, at least in part, by the motion system, when mounted onto the mounting base and operating, to avoid unwanted movements of the mounting base. Each active bearing further includes an upper panel mounted against the lower side of the mounting base, and a lower panel mounted against the upper side of the supporting frame. The mounting base has through-holes extending from the upper side to the lower side of the mounting base and a first set of fixation elements mounted inside respective through-holes to secure the active bearing upper panel to the lower side of the mounting base. Each active bearing includes a second set of fixation elements to secure the active bearing lower panel to the upper side of the supporting frame.

According to example embodiments, each of the first set of fixation elements is in the form of a screw. The upper panel includes threaded through-holes axially aligned with respective through-holes of the mounting base and receiving a threaded part of respective screws.

According to example embodiments, each through-hole of the mounting base includes an upper portion having a first diameter and a lower portion having a second diameter smaller than the first diameter to form a shoulder onto which the screw head of a corresponding screw rests to secure the active bearing upper panel to the lower side of the mounting base.

According to example embodiments, each of the second set of fixation elements is in the form of a screw. The lower panel of each active bearing includes through-holes and captive screw retainers. Each captive screw retainer includes a housing lodging a screw engaged with respective through-hole of the lower panel of the active bearing. The housing includes an upper portion having a central opening axially aligned with the screw head of the screw. The upper side of the supporting frame includes threaded holes receiving a threaded part of the screw of respective captive screw retainer.

According to example embodiments, the through-holes of each active bearing lower panel are axially aligned with respective threaded through-holes of each active bearing upper panel.

According to example embodiments, each captive screw retainer further includes a magnet arranged to hold the screw when the screw is removed from the corresponding threaded hole of the upper side of the supporting frame during the disassembly of the corresponding active bearing for its replacement.

According to example embodiments, a method for disassembling and removing an active bearing from the active bearing compartment of the active anti-vibration system, e.g., as described above, includes: (a) handling a screwing tool to unscrew and remove the first set of screws from the through-holes of the mounting base to disconnect the upper panel of an active bearing from the lower side of the mounting base; (b) handling the screwing tool with a rod to align the distal end of the rod with one through-hole of the mounting base and to move down the rod through the through-hole, and the threaded through-hole of the active bearing upper panel down to the central opening of the housing of one captive screw retainer to engage with the screw head of the screw; (c) handling the screwing tool to disengage, with the rod, the threaded part of the screw from the corresponding threaded hole of the supporting frame to disconnect the active bearing lower panel from the upper side of the supporting frame; (d) repeating the handling (b) and the handling (c) for the other screws connecting the active bearing to the upper side of the supporting frame; and (e) sliding the active bearing out of the active bearing compartment of the active anti-vibration system.

Further features and aspects of example embodiments of the present invention are described in more detail below with reference to the appended schematic Figures.

BRIEF DESCRIPTION OF THE DRAWINGS

FIGS. 7a and 7b are perspective views of a captive screw retainer that includes a flat side.

FIG. 8 is a perspective view of a portion of the active bearing lower panel that includes the captive screw retainer illustrated in FIGS. 7a and 7b.

FIG. 9 is a cross-sectional view of the portion of the active bearing lower panel illustrated in FIG. 8 sliding on the upper side of the supporting frame when the active bearing is mounted on or removed from the active anti-vibration system.

DETAILED DESCRIPTION

Figure 1:
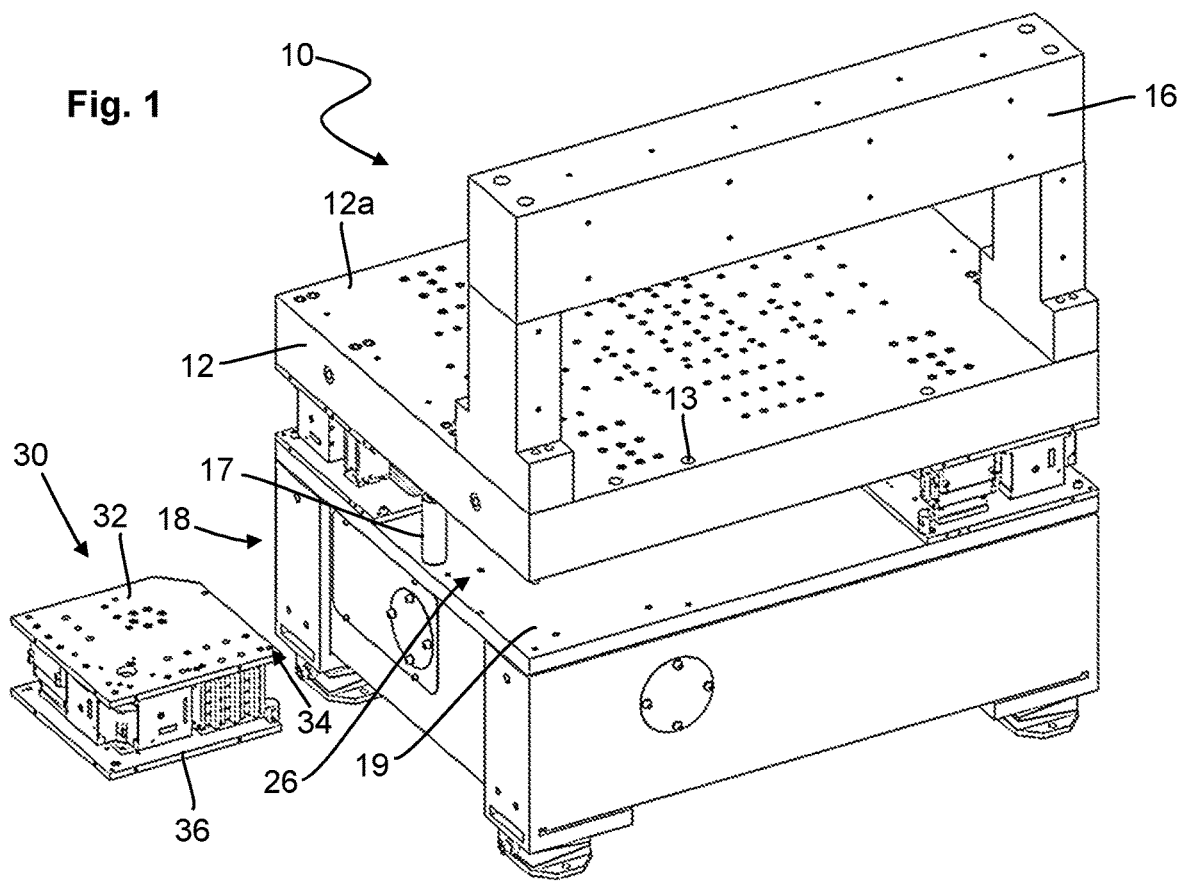
FIG. 1 is a perspective view of an active anti-vibration system including several active bearings assembled between a mounting base and a supporting frame that rests on the floor, in which one active bearing is disassembled from the active anti-vibration system.

As illustrated in FIG. 1, the active anti-vibration system 10 includes a mounting base 12 having an upper side 12a onto which a precision motion system, for example, a semiconductor processing equipment, can be mounted. The mounting base 12 is, for example, formed of granite and includes multiple threaded holes for fixing different types of precision motion systems. The mounting base 12 may further include a support 16 for installing an optical imaging device, such as a microscope for visual inspection. The active anti-vibration system 10 further includes a supporting frame 18 resting on the floor, and active bearings 30 mounted into an active bearing compartment 26 between the mounting base 12 and the supporting frame 18. Each active bearing 30 includes a mechanical spring or an air spring to support the mounting base, and passively isolate the base from the floor vibrations.

Figure 2:
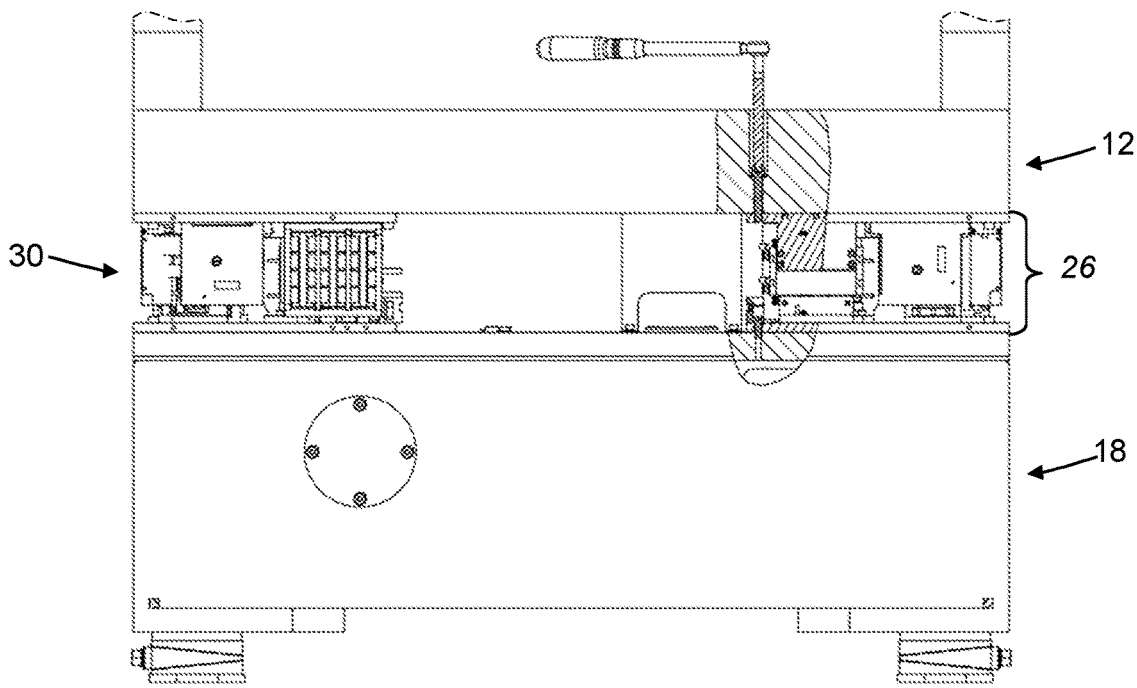
FIG. 2 is a partial cross-sectional view of the system, when a screw is removed from an upper panel of an active bearing to disconnect the active bearing upper panel from the mounting base.

Four active bearings 30 are, for example, mounted on the four corners of the active bearing compartment 26 that is defined by a lower side 12b of the mounting base 12 and an upper side 19 of the supporting frame 18, as illustrated, for example, in FIG. 2. The active bearing 30 includes inertial sensors and actuators to provide together a six degrees-of-freedom (DOF) measurement of the motions of the mounting base 12 as well as six-DOF actuation devices. Six-DOF measurement is obtained with six or more inertial sensors shared among the active bearings. Six-DOF actuation can be obtained with six or more actuators shared among the active bearings. For example, three active bearings each include a horizontal actuator, a vertical actuator, a horizontal inertial sensor, and a vertical inertial sensor, and the fourth active bearing include a horizontal actuator and a vertical actuator only.

The sensors and actuators are built into an active damping multiple-inputs/multiple-outputs (MIMO) control loop that dampens any residual vibrations of the granite base. An active feedforward path is implemented which uses the known motions of the motion system to compute forces and torques to be applied by the actuators to the mounting base to compensate for reaction forces and thus avoid unwanted motions of the base.

Each active bearing 30 further includes an upper panel 32 mounted against the lower side 12b of the mounting base 12, and a lower panel 36 mounted against the upper side 19 of the supporting frame 18.

Figure 3:
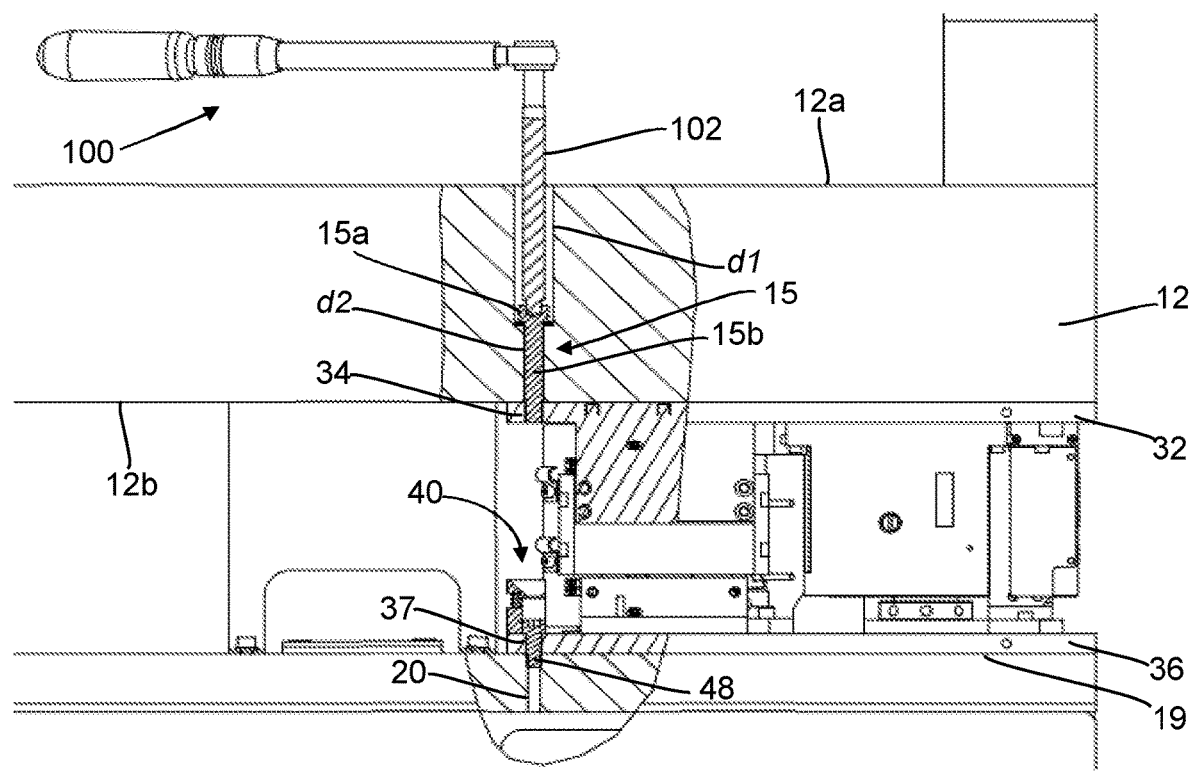
FIG. 3 is an enlarged cross-sectional view of the system, in the area of the active bearing.

As illustrated in FIG. 3, the mounting base 12 of the active anti-vibration system 10 includes through-holes 13 extending from the upper side 12a to the lower side 12b of the mounting base 12. Each through-hole 13 of the mounting base 12 includes an upper portion having a first diameter d1 and a lower portion having a second diameter d2 smaller than the first diameter d1 to form a shoulder 14. A first set of fixation elements 15 are arranged into the through-holes 13 to fix the upper panel 32 of each active bearing 30 against the lower side 12b of the mounting base 12. The fixation elements are, for example, screws 15 that include a screw head 15a resting on the shoulder 14 and a threaded part 15b extending through the lower portion of the second diameter d2, in which a distal portion of the threaded part 15b is screwed into a corresponding threaded through-hole 34 of the upper panel 32 of the active bearing 30.

A second set of fixation elements are arranged into through-holes 37 of the lower panel 36 of each active bearing to fix the active bearing lower panel 36 to the upper side 19 of the supporting frame 18. For example, the second set of fixation elements are provided in the form of three or more captive screw retainers 40.

Figure 10:
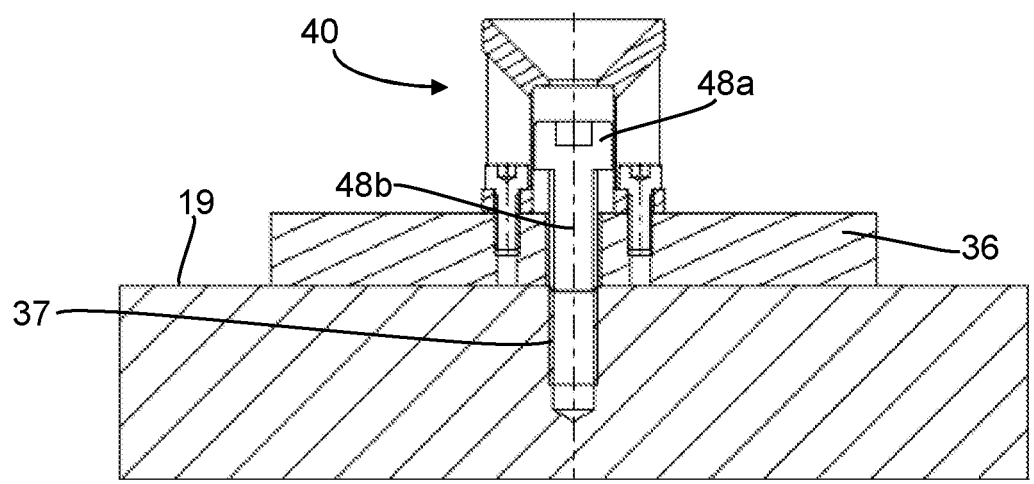
FIG. 10 is a cross-sectional view illustrating that the active bearing has reached its mounting position before being fixed to the upper side of the supporting frame of the active anti-vibration system.
Figure 11:
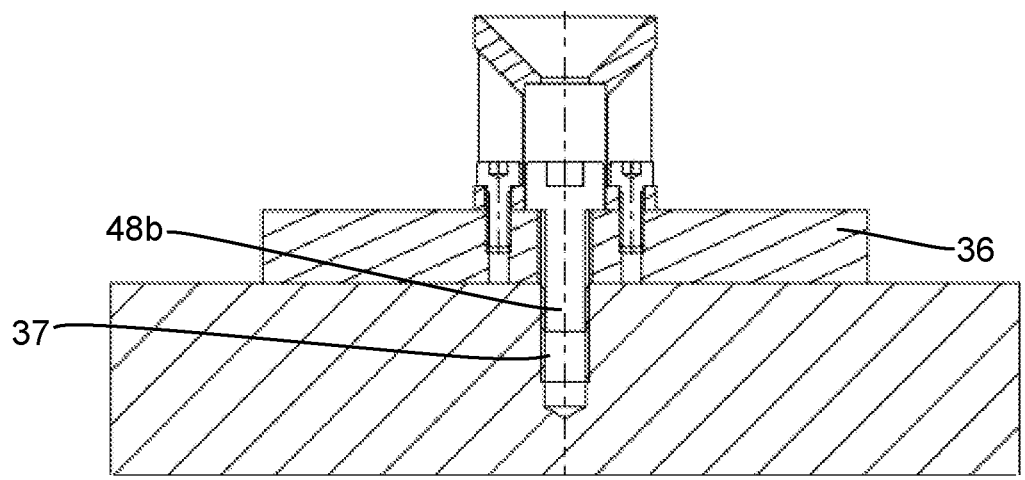
FIG. 11 is a cross-sectional view illustrating that the active bearing has been fixed to the upper side of the supporting frame of the active anti-vibration system.

As illustrated in FIGS. 6 to 11, each captive screw retainer 40 includes a housing 42, which may be formed, for example, by an additive manufacturing process. The housing is, for example, formed of plastic and is adapted to house a screw 48 engaged with respective through-hole 37 of the active bearing lower panel 36. The housing 42 includes an upper portion 44 having a funnel shape with a central opening 45 aligned with the screw head 48a of the screw 48, as illustrated in FIGS. 9 to 11. The upper side 19 of the supporting frame 18 includes threaded holes 20 into which are screwed a threaded part 48b of the screw 48 of respective captive screw retainer 40.

Each captive screw retainer 40 further includes a magnet 47 arranged in the housing 42 to hold the screw 48 within the captive screw retainer when the screw is removed from the corresponding threaded hole 20 of the upper side 19 of the supporting frame 18 during the disassembly of the corresponding active bearing 30 for its replacement.

The housing 42 of the captive screw retainer 40 may be fixed to the active bearing lower panel 36 with different fixation device(s). For example, the housing 42 is screwed onto the active bearing lower panel 36. In this respect, the housing 42 includes two lateral openings 50, each having a through-hole 52 extending through the mounting base of the housing for accommodating a screw 49 ensuring the connection with the active bearing lower panel 36 as illustrated in FIGS. 9 to 11. For example, the housing of the captive screw retainers may simply be glued onto the active bearing lower panel.

In case the captive screw retainers 40 need to be placed very near the edge of the upper side surface of the supporting frame 18 or mechanical parts in the active bearing limit the space available, the housing 42 can be cut along a vertical plane to have flat side 46, as illustrated, for example, in FIG. 7a.

The through-holes 37 of the active bearing lower panel 36 are axially aligned with respective threaded through-holes 34 of active bearing upper panel 32 for ready replacement of any active bearing in case of failure as described below.

As illustrated in FIGS. 2 and 3, which illustrate an operation to remove a faulty active bearing 30 from the active anti-vibration system for its replacement, a screwing tool is used to remove the first set of screws 15 connecting the active bearing upper panel 32 to the lower side 12a of the mounting base 12. For this operation, a screwdriver or a torque wrench 100, such as a ratchet wrench 100, may be used. In the latter case, a rod 102a with a distal end configured to engage the screw head 15a of the screws 15 is used together with the wrench 100 for unscrewing the threaded part 15b of the screws from respective threaded through-hole 34 of the active bearing upper panel 34. The distal end of the rod 102a is magnetized to lift the screws 15 out of the through-holes 13 of the mounting base 12.

Once the screws 15 are removed from the mounting base 12, the wrench 100 is used with another rod 102b, which is specifically configured to unscrew the screw head 48a of respective captive screw retainer 40 of the active bearing lower panel 36 from the upper side 12a of the mounting base 12. The length of this rod 102b is therefore significantly longer than the rod 102a used for removing the first set of screws 15. The outer diameter of the rod 102b is also smaller than both the lower portion d2 of the through-holes 13 and the threaded through-hole 34 of the active bearing upper panel 32.

The wrench 100 can thus be utilized to introduce the rod 102b into each through-hole 13 and to move its distal end downwardly though the corresponding threaded through-hole 34 of the active bearing upper panel 34 down to respective captive screw retainer 40. The funnel-shaped upper portion 44 of the housing 42 of respective screw retainer 40 guides the distal end of the rod 102b into the central opening 45 such that the distal end of the rod 102b engages with the screw head 48a of respective captive screw retainer 40.

The wrench 100 is then utilized for unscrewing the threaded part 48b of the screws from respective threaded hole of upper side 19 of the supporting frame 18 of the anti-vibration system 10. As soon as the threaded part 48b of these screws is disengaged from the supporting frame upper side and the rod 102b is disengaged from the screw head 48a, the magnet 47 of the captive screw retainer 40 attracts and hold the screws 48 such that the end of the threaded part 48b is inside respective through-hole 37 of the active bearing lower panel 36 and distant from the upper side 19, as illustrated in FIG. 9. When all captive screws 48 have been released, the active bearing 30 can thus be slid along the upper side 19 out of the active bearing compartment 26 without scraping the upper side surface of the supporting frame 18. A screw jack 17 can be used to temporarily slightly increase the height of the active bearing compartment 26 to facilitate the sliding of the active bearing 30 out of the active bearing compartment and into the compartment.

Before mounting a new active bearing 30, the magnet 47 of each captive screw retainers 40 mounted on the active bearing lower panel 36 hold respective screws in the same position illustrated in FIG. 9. The new active bearing 30 can thus be placed inside the active bearing compartment 26 of the anti-vibration system 10 and slid on the upper side surface of the supporting frame in its mounting position, in which the threaded through-holes 34 of the active bearing upper panel 32 and the through-hole 37 of the active bearing lower panel 36 are axially aligned with the respective through-holes 13 extending from the upper side 12a to the lower side 12b of the mounting base.

Figure 4:
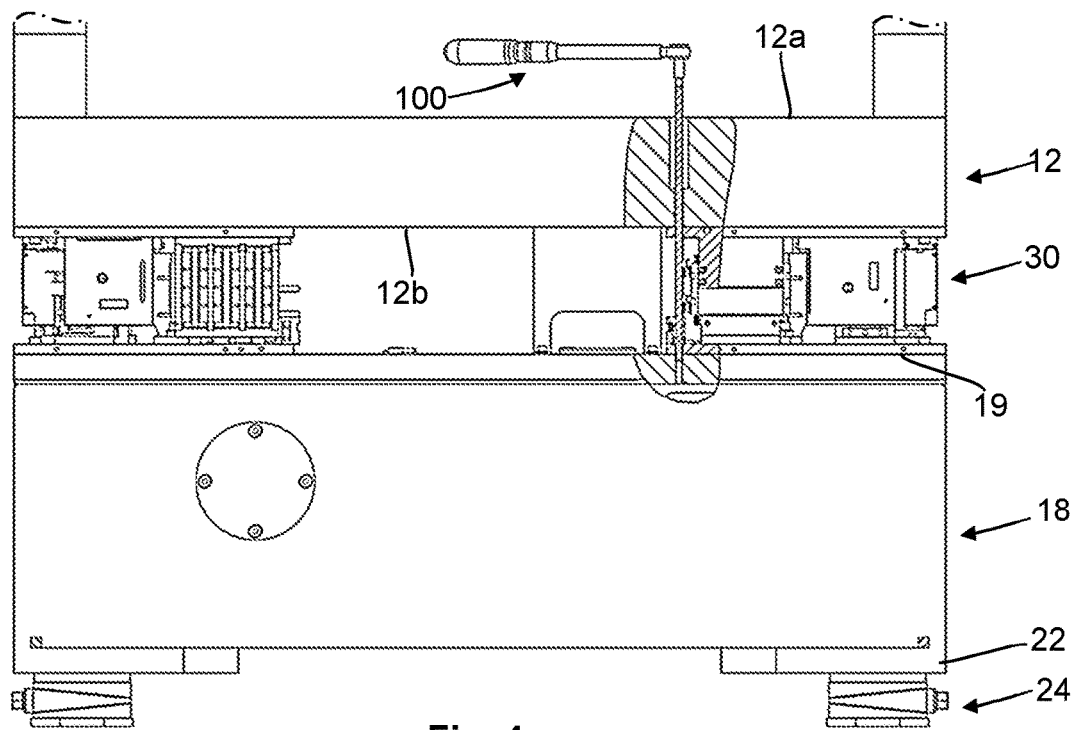
FIG. 4 is a partial cross-sectional side view of the system, when a screw of a captive screw retainer is removed from a lower panel of the active bearing to disconnect the active bearing lower panel from an upper side of the supporting frame.
Figure 5:
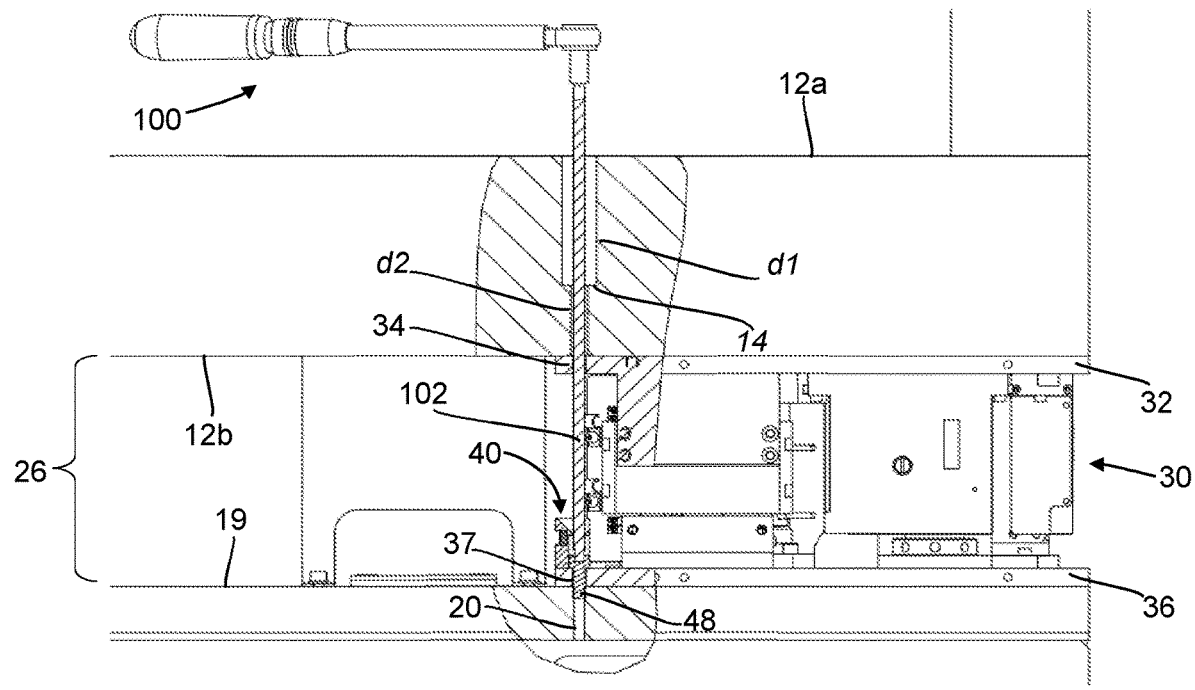
FIG. 5 is an enlarged view of the system in the area of the active bearing.
Figure 6:
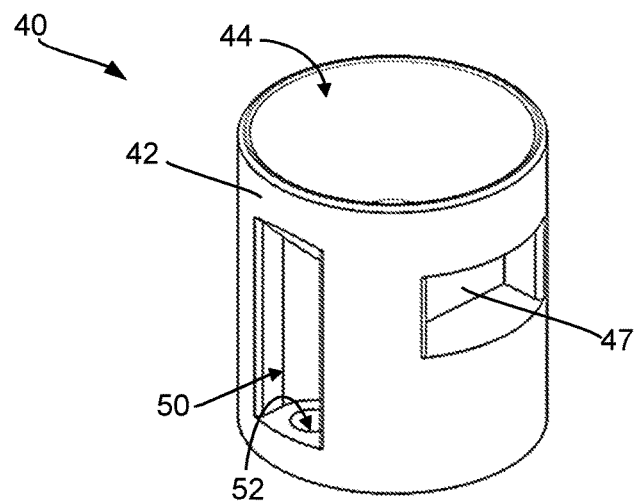
FIG. 6 is a perspective view of the captive screw retainer illustrated in FIG. 4

As illustrated in FIG. 4, the ratchet wrench 100 is utilized in a similar manner as for disengaging the screws from respective threaded hole 20 of upper side 19 of the supporting frame 18 of the anti-vibration system, as explained above. This time, the ratchet wrench 100 is utilized to fix the active bearing lower panel against the supporting frame by screwing the threaded part of screws in the respective threaded holes 20 of the upper side of the supporting frame, as illustrated in FIGS. 10 and 11.

The screws 15 are then positioned in the respective through-holes 13 of the mounting base 12 and screwed, by the ratchet wrench 100 with the extension 102a into respective threaded through-holes 34 of the active bearing upper panel 32.

LIST OF REFERENCE CHARACTERS d1 Upper portion of a first diameter
d2 Lower portion of a second diameter
10 Active anti-vibration system
12 Mounting base
12a Upper side
12b Lower side
13 Through-holes
14 Shoulder
15 Fixation element (e.g., screw)
15a Screw head
15b Threaded part
16 Support
17 Screw jack
18 Supporting frame
19 Upper side
20 Threaded hole
26 Active bearing compartment
30 Active bearings
32 Upper panel
34 Threaded through-hole
36 Lower panel
37 Through-hole
40 Captive screw retainer
42 Housing
44 Upper portion 45 Central opening
46 Flat side
47 Magnet
48 Screw
48a Screw head
48b Threaded part
49 Fixation device (e.g., screw)
50 Lateral openings
52 Through-hole
100 Tool (e.g., ratchet wrench, screwdriver)
102a First rod
102b Second rod

What is claimed is:

1. An active anti-vibration system, comprising:
a mounting base having an upper side adapted to mount a motion system thereon;
a supporting frame adapted to rest on a floor; and
active bearings mounted in an active bearing compartment delimited by a lower side of the mounting base and an upper side of the supporting frame;
wherein each active bearing includes actuators adapted to impart counteracting forces to the mounting base to compensate for reactive forces generated by the motion system to avoid unwanted movements of the mounting base and dampen residual movements, an upper panel mounted against the lower side of the mounting base, and a lower panel mounted against the upper side of the supporting frame;
wherein the mounting base includes through-holes extending from the upper side to the lower side of the mounting base and a first set of fixation devices mounted inside respective through-holes to secure the upper panel of the active bearing to the lower side of the mounting base; and
wherein the active bearing includes a second set of fixation devices to secure the lower panel of the active bearing to the upper side of the supporting frame.

2. The system according to claim 1, wherein the reactive forces are generated by the motion system mounted onto the mounting base and during operation of the motion system.

3. The system according to claim 1, wherein the motion system is mounted on the upper side of the mounting base.

4. The system according to claim 1, wherein each of the first set of fixation elements includes a screw, the upper panel includes threaded through-holes axially aligned with respective through-holes of the mounting base and adapted to receive a threaded part of screws.

5. The system according to claim 1, wherein the first set of fixation elements includes a first screw, the upper panel includes threaded through-holes axially aligned with respective through-holes of the mounting base and adapted to receive a threaded part of the first screw.

6. The system according claim 5, wherein each through-hole of the mounting base includes an upper portion having a first diameter and a lower portion having a second diameter smaller than the first diameter to form a shoulder onto which a screw head of a corresponding screw rests to secure the upper panel of the active bearing to the lower side of the mounting base.

7. The system according to claim 5, wherein each second set of fixation elements includes a second screw, the lower panel of each active bearing including through-holes and captive screw retainers, each captive screw retainer including a housing lodging the second screw engaged with respective through-hole of the lower panel of the active bearing, the housing including an upper portion having a central opening axially aligned with screw head of the second screw, the upper side of the supporting frame including threaded holes receiving a threaded part of the second screw of a respective captive screw retainer.

8. The system according to claim 5, wherein the second set of fixation elements includes a second screw, the lower panel of the active bearing including through-holes and captive screw retainers, the captive screw retainer including a housing lodging the second screw engaged with respective through-hole of the lower panel of the active bearing, the housing including an upper portion having a central opening axially aligned with screw head of the second screw, the upper side of the supporting frame including threaded holes receiving a threaded part of the second screw of a respective captive screw retainer.

9. The system according to claim 8, wherein each captive screw retainer includes a magnet adapted to hold the second screw upon removal from the corresponding threaded hole of the upper side of the supporting frame during disassembly of the corresponding active bearing for replacement.

10. The system according to claim 8, wherein the captive screw retainer includes a magnet adapted to hold the second screw upon removal from the corresponding threaded hole of the upper side of the supporting frame during disassembly of the corresponding active bearing for replacement.

11. The system according to claim 8, wherein the through-holes of the lower panel of each active bearing lower panel are axially aligned with respective threaded through-holes of the upper panel of the active bearing.

12. The system according to claim 8, wherein the through-holes of the lower panel of the active bearing lower panel are axially aligned with respective threaded through-holes of the upper panel of the active bearing.

13. The system according to claim 12, wherein the captive screw retainer includes a magnet adapted to hold the second screw upon removal from the corresponding threaded hole of the upper side of the supporting frame during disassembly of the corresponding active bearing for replacement.

14. The system according to claim 12, wherein each captive screw retainer includes a magnet adapted to hold the second screw upon removal from the corresponding threaded hole of the upper side of the supporting frame during disassembly of the corresponding active bearing for replacement.

15. A method for disassembling and removing an active bearing from the active bearing compartment of the active anti-vibration system recited in claim 8, comprising:
(a) using a screwing tool, unscrewing and removing the first screws from the through-holes of the mounting base to disconnect the upper panel of the active bearing from the lower side of the mounting base;
(b) using the screwing tool with a rod, aligning a distal end of the rod with one of the through-holes of the mounting base and moving the rod down through the one of the through-holes and down the threaded through-hole of the upper panel of the active bearing down to the central opening of the housing of one captive screw retainer to engage with the screw head of the second screw;
(c) using the screwing tool and the rod, disengaging the threaded part of the second screw from a corresponding threaded hole of the supporting frame to disconnect the lower panel of the active bearing from the upper side of the supporting frame;
(d) repeating (c) and (d) for other second screws connecting the active bearing to the upper side of the supporting frame; and (e) sliding the active bearing out of the active bearing compartment of the active anti-vibration system.

16. The method according to claim 15, wherein the through-holes of the lower panel of the active bearing lower panel are axially aligned with respective threaded through-holes of the upper panel of the active bearing.

17. The method according to claim 15, wherein the captive screw retainer includes a magnet adapted to hold the second screw upon removal from the corresponding threaded hole of the upper side of the supporting frame during disassembly of the corresponding active bearing for replacement.

18. The system according to claim 16, wherein the captive screw retainer includes a magnet adapted to hold the second screw upon removal from the corresponding threaded hole of the upper side of the supporting frame during disassembly of the corresponding active bearing for replacement.

19. A method for disassembling and removing an active bearing from the active bearing compartment of the active anti-vibration system recited in claim 7, comprising:
   (a) using a screwing tool, unscrewing and removing the first screws from the through-holes of the mounting base to disconnect the upper panel of the active bearing from the lower side of the mounting base;
   (b) using the screwing tool with a rod, aligning a distal end of the rod with one of the through-holes of the mounting base and moving the rod down through the one of the through-holes and down the threaded through-hole of the upper panel of the active bearing down to the central opening of the housing of one captive screw retainer to engage with the screw head of the second screw;
   (c) using the screwing tool and the rod, disengaging the threaded part of the second screw from a corresponding threaded hole of the supporting frame to disconnect the lower panel of the active bearing from the upper side of the supporting frame;
   (d) repeating (c) and (d) for other second screws connecting the active bearing to the upper side of the supporting frame; and
   (e) sliding the active bearing out of the active bearing compartment of the active anti-vibration system.

20. The method according to claim 19, wherein the through-holes of the lower panel of each active bearing lower panel are axially aligned with respective threaded through-holes of the upper panel of the active bearing.

21. The method according to claim 19, wherein each captive screw retainer includes a magnet adapted to hold the second screw upon removal from the corresponding threaded hole of the upper side of the supporting frame during disassembly of the corresponding active bearing for replacement.

22. The method according to claim 20, wherein each captive screw retainer includes a magnet adapted to hold the second screw upon removal from the corresponding threaded hole of the upper side of the supporting frame during disassembly of the corresponding active bearing for replacement.

* * * * *